US012761897B2

(12) United States Patent
Fabrici et al.

(10) Patent No.: US 12,761,897 B2
(45) Date of Patent: Oct. 13, 2026

(54) HOUSEHOLD APPLIANCE FIRMWARE UPDATE

(71) Applicant: ELECTROLUX APPLIANCES AKTIEBOLAG, Stockholm (SE)

(72) Inventors: Lucio Fabrici, Porcia (IT); Mauro Taiariol, Porcia (IT); Livio Plos, Porcia (IT); Daniele Biasutti, Porcia (IT)

(73) Assignee: ELECTROLUX APPLIANCES AKTIEBOLAG, Stockholm (SE)

(*) Notice: Subject to any disclaimer, the term of this patent is extended or adjusted under 35 U.S.C. 154(b) by 189 days.

(21) Appl. No.: 18/569,723

(22) PCT Filed: Jun. 14, 2021

(86) PCT No.: PCT/EP2021/065991
§ 371 (c)(1),
(2) Date: Dec. 13, 2023

(87) PCT Pub. No.: WO2022/262940
PCT Pub. Date: Dec. 22, 2022

(65) Prior Publication Data
US 2024/0211245 A1 Jun. 27, 2024

(51) Int. Cl.
*G06F 8/65* (2018.01)

(52) U.S. Cl.
CPC .................................... *G06F 8/65* (2013.01)

(58) Field of Classification Search
CPC ......................... G06F 8/61-65; G06F 8/71-75
See application file for complete search history.

(56) References Cited

U.S. PATENT DOCUMENTS

2013/0182693 A1* 7/2013 Sperling .............. H04W 12/50 370/338
2014/0344798 A1 11/2014 Sasaki
(Continued)

FOREIGN PATENT DOCUMENTS

KR 20070038681 A 4/2007
KR 20180082243 A 7/2018
KR 20180090131 A 8/2018

OTHER PUBLICATIONS

Electrolux Appliances Aktiebolag, International Patent Application No. PCT/EP2021/065991, International Search Report, Feb. 23, 2022.
(Continued)

*Primary Examiner* — Duy Khuong T Nguyen
(74) *Attorney, Agent, or Firm* — Moore & Van Allen PLLC

(57) ABSTRACT

A household appliance (100) may include one or more processing units (PUx, PUx, PUe, PUs) for controlling electrically and/or electronically controllable components (120(*x*), 120(*y*), 120(*e*), 120(*s*)) according to a corresponding instructions set (F(x), F(y), F(e), F(s)), and a communication unit (PUn) for allowing a data communication between the household appliance (100) and an external server (140) through a communication network (150). The communication unit (PUn) is configured for receiving from the external server (140) an update data distribution (UD) comprising, for each instructions set (F(x), F(y), F(e), F(s)) installed at the corresponding processing unit, a corresponding update data package comprising a latest version of said instructions set. Each selected processing unit (PUx, PUx, PUe, PUs) is configured to update the corresponding instructions set installed thereat with the latest version of said (Continued)

instructions set included in the corresponding update package received from the communication unit (PUn).

15 Claims, 4 Drawing Sheets

(56) References Cited

U.S. PATENT DOCUMENTS

| | | | | |
|---|---|---|---|---|
| 2017/0242674 | A1* | 8/2017 | Hussein | H04L 67/12 |
| 2022/0083324 | A1* | 3/2022 | Singh | G06F 3/065 |

OTHER PUBLICATIONS

Electrolux Appliances Aktiebolag, International Patent Application No. PCT/EP2021/065991, Written Opinion, Feb. 23, 2022.
Electrolux Appliances Aktiebolag, Korean Patent Application No. 10-2023-7045305, Office Action, Feb. 13, 2026.

* cited by examiner

HOUSEHOLD APPLIANCE FIRMWARE UPDATE

CROSS-REFERENCE TO RELATED APPLICATIONS

This application is a National Stage Patent Application (filed under 35 § U.S.C. 371) of PCT/EP2021/065991, filed Jun. 14, 2021, of the same title; the contents of which are hereby incorporated by reference.

FIELD OF THE INVENTION

The solution according to embodiments of the present invention generally relates to the household appliance field. More specifically, the solution according to embodiments of the present invention relates to a firmware update system for a household appliance.

BACKGROUND OF THE INVENTION

Modern household appliances are capable of performing a number of different tasks. For this reason, a household appliance is equipped with one or more Printed Circuit Board Assemblies (PCBA) each one comprising one or more processing units (e.g., processors or controllers) adapted to control corresponding electric/electronic components (e.g., electronic switches, TRIACs, power transistors, heating resistors, electronic displays) for performing specific functions during the operation of the household appliance.

Each processing unit of a PCBA is configured to control the corresponding electric/electronic components according to a corresponding instructions set (firmware) stored at the processing unit, e.g., in a memory unit of the processing unit. Moreover, the memory units of the processing units may also store configuration data configured to modify a behavior of the stored instruction sets according to a specific model of the household appliance.

In order to upgrade the processing units, for example to add new configurations settings and/or new functionalities, the corresponding firmware and/or the configuration data stored in the memory units are subjected to (e.g., periodical) updates, referred to as "firmware updates".

For the sake of coinciseness, hereinafter, the expressions "instruction set" and "firmware" are to be intended in a broad way, so as to include not only the instruction sets or firmware themselves, but also possible configuration data for the configuration of said instruction set or firmware.

By the same token, hereinafter, the expression "firmware update" is to be intended in a broad way, so as to include an update of the instruction sets or firmware stored in a memory unit of the processing unit and/or an update of the configuration data for said instruction sets or firmware.

In order to carry out a firmware update, new versions of the firmware and/or configuration data that are already installed at the processing units are provided to the household appliance in form of update data packages.

The update data packages may be provided by an external server, and delivered to the household appliance through a communication network, such as the Internet. For this purpose, the household appliance may be provided with a communication unit configured for allowing a data communication between the household appliance and said external server.

By making reference to the so-called Over-The-Air (OTA) firmware update modality, the household appliance receives the update data packages from said external server through a wireless communication link. For example, the communication unit of the household appliance may be configured to establish a wireless (e.g., Wi-Fi) communication link with a router, through which a (e.g., Internet) communication link can be established with the external server.

SUMMARY OF THE INVENTION

The Applicant has found that the management of firmware updates in form of update data packages wirelessly received by an external server, and especially according to the OTA update modality, is a very critical task, that can be affected by several drawbacks.

The update data packages wirelessly received via Internet may be corrupted or lacking of some parts, for example because of a network malfunctioning during the transmission of the update data packages. In this situation, the firmware update cannot be carried out or, following the conclusion of the firmware update, the correct operation of the household appliance itself may be negatively affected. The installation of the corrupted and/or incomplete update data packages may even totally prevent the operation of the household appliance.

Since household appliances generally comprise a plurality of processing units, serious issues may arise if, as a result of a firmware update following the reception of update data packages, the firmware versions of the various processing unit are not compatible to each other.

Furthermore, having the household appliance be connected to an external data communication network for receiving the update data packages, undesired external events and/or unauthorized household appliance accesses occurring during the firmware update may disrupt the correct outcome of the update and/or the correct operation of the household appliance after the update.

Moreover, known modalities for updating the firmware of household appliances may disadvantageously require a too invasive intervention by a user, and/or causing excessively frequent and/or long interruptions in the normal operation of the household appliance.

The Applicant has therefore faced the problem of avoiding, or at least mitigating the abovementioned drawbacks affecting the known firmware updates.

In particular, one or more aspects of the solution according to specific embodiments of the invention are set out in the independent claims, with advantageous features of the same solution that are indicated in the dependent claims (with any advantageous feature provided with reference to a specific aspect of the solution according to an embodiment of the invention that applies mutatis mutandis to any other aspect thereof).

An aspect of the solution according to one or more embodiments of the invention relates to a household appliance.

The household appliance comprises one or more processing units for controlling electrically and/or electronically controllable components of the household appliance according to a corresponding instructions set during a first operating mode of the household appliance.

The household appliance further comprises a communication unit for allowing a data communication between the household appliance and an external server through a communication network.

Each instructions set corresponding to a processing unit is installed at said processing unit.

The communication unit is configured for receiving from the external server an update data distribution comprising, for each instructions set installed at the corresponding processing unit, a corresponding update data package comprising a latest version of said instructions set.

The communication unit is further configured for carrying out the following operations during a second operating mode of the household appliance:

- preventing data communication between the household appliance and the external server;
- providing to each one among a set of selected processing units the corresponding update package, each selected processing unit of the set of selected processing units being selected based on a comparison between a version of the instructions set installed at the corresponding processing unit with the latest version of said instructions set included in the corresponding update package;

wherein:

- each selected processing unit is configured to update the corresponding instructions set installed thereat with the latest version of said instructions set included in the corresponding update package received from the communication unit.

With the expression "preventing data communication between the household appliance and the external server" it is herein preferably meant that the communication between the household appliance and external units—through the communication network—is prevented as a whole.

With the expression "providing to each one among a set of selected processing units the corresponding update package" it is meant that the update packages are sent to a set of selected processing units comprising one or more processing units.

Since data communication between the household appliance and external units is disabled during the firmware update, undesired external events and/or unauthorized accesses to the household appliance are advantageously prevented. In this way, the possibility of disruptions in the correct outcome of the update and/or in the correct operation of the household appliance after the update are strongly reduced.

Moreover, since the update data distribution received from the external server is a complete and coherent update data set comprising updates for all the instruction sets of all the processing units of the household appliance, it is avoided that the firmware update causes incompatibilities among the operations carried out by different processing units of the household appliance.

According to an embodiment of the present invention, the communication unit is further configured for carrying out during said second operating mode the following operations for each processing unit:

- comparing a version of the instructions set installed at said processing unit with the latest version of said instructions set included in the corresponding update package;
- selecting said processing unit for providing thereto the corresponding update package if the instructions set installed at said processing unit has a version different from (e.g., older than) said latest version.

In this way, only the instruction sets of the processing units having an outdated version are subjected to an update, reducing thus the time required for performing the update.

According to an embodiment of the present invention, the communication unit is configured for receiving from the external server said update data distribution during the first operating mode of the household appliance.

In this way, the downloading of the update data distribution can be advantageously performed in background, while the household appliance is still operating in its standard operating mode.

According to an embodiment of the present invention, the communication unit is configured to verify authenticity and/or integrity of the received update data packages during a package verifying phase of the household appliance.

In this way, it is advantageously avoided the possibility of having incorrect updates caused by received update data packages that are corrupted or lacking of some parts.

According to an embodiment of the present invention, said package verifying phase occurs after said data communication between the household appliance and the external server is prevented.

According to an embodiment of the present invention, said package verifying phase occurs before said second operating mode.

According to an embodiment of the present invention, the received update data packages are protected by means of digital signature through an asymmetric key.

According to an embodiment of the present invention, the communication unit is configured to verify said authenticity and/or integrity of the received update data packages by verifying said digital signature during said package verifying phase of the household appliance through a digital certificate.

According to an embodiment of the present invention, the communication unit is further configured to check the validity of the digital certificate during said package verifying phase of the household appliance.

According to an embodiment of the present invention, each processing unit comprises a respective processing unit memory element configured to store said installed instructions set corresponding to said processing unit.

According to an embodiment of the present invention, the communication unit comprises a communication unit memory element configured to store the received update data distribution comprising said update data packages.

According to an embodiment of the present invention, said communication unit memory element is further configured to store a backup data distribution comprising a current version of the instructions set installed at the processing units.

According to an embodiment of the present invention, the communication unit is configured to store into the communication unit memory element a new backup data distribution in the place of a previously stored backup data distribution after that each selected processing unit has updated the corresponding instructions set.

According to an embodiment of the present invention, said new backup data distribution corresponds to the received update data distribution comprising said update data packages exploited by the selected processing units for updating the corresponding instructions sets.

In this way, there is no need of carrying out further operations (e.g., a dedicated backup download from the external server) because the update distribution is already stored in the household appliance.

According to an embodiment of the present invention, said one or more processing units are prevented from controlling said electrically and/or electronically controllable components of the household appliance during said second operating mode.

In this way, dangerous interactions among processing units having different and not compatible firmware versions (caused by a not yet concluded update) are advantageously prevented.

According to an embodiment of the present invention, the household appliance is configured to switch from the second operating mode to the first operating mode after that each selected processing unit has updated the corresponding instructions set.

According to an embodiment of the present invention, said household appliance is a selected one among:

a laundry machine configured to wash and/or dry laundry;
a dishwasher;
a oven;
a refrigerator;
a cooking hob.

BRIEF DESCRIPTION OF THE ANNEXED DRAWINGS

These and other features and advantages of the present invention will be made apparent by the following description of some exemplary and non limitative embodiments thereof; for its better intelligibility, the following description should be read making reference to the attached drawings, wherein:

FIG. 1 schematically illustrates a household appliance wherein concepts according to the embodiments of the present invention can be applied;

DETAILED DESCRIPTION OF PREFERRED EMBODIMENTS OF THE INVENTION

Figure 1:
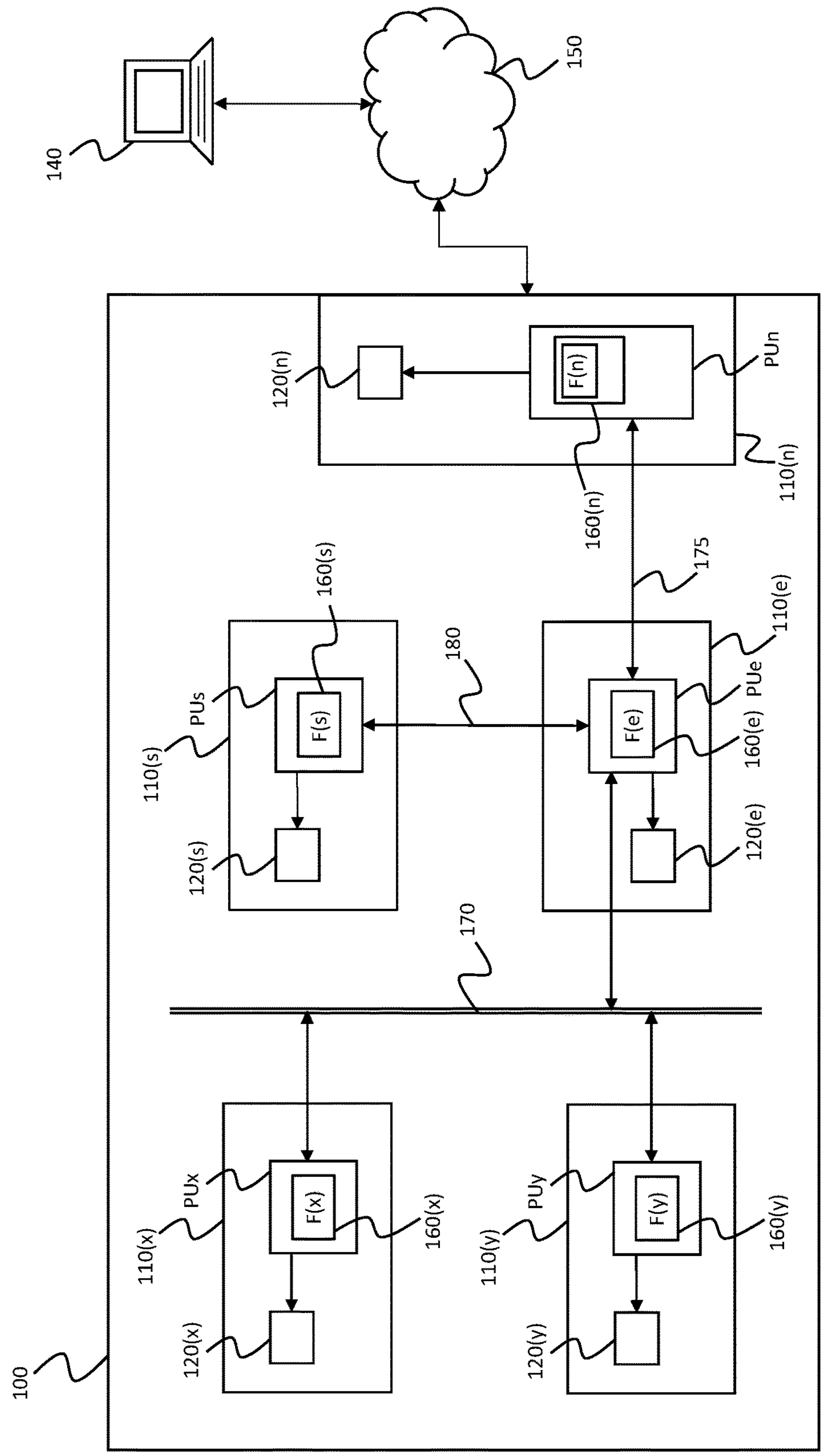

With reference to the drawings, FIG. 1 schematically illustrates in terms of functional blocks a household appliance 100 wherein concepts according to the embodiments of the present invention can be applied.

The household appliance 100 may be for example a laundry machine configured to wash and/or dry laundry, a dishwasher, an oven, a refrigerator, or a cooking hob. However, it is underlined that the concepts of the present invention can be also applied to other kinds of household appliances not included in the abovementioned exemplary list.

According to an embodiment of the present invention, the household appliance 100 comprises one or more PCBA each one comprising one or more processing units (e.g., processors or controllers) adapted to control corresponding electric/electronic components of the household appliance 100 for performing specific functions during the operation of the household appliance 100.

In the exemplary case illustrated in FIG. 1, the household appliance 100 comprises:

a PCBA 110(*x*) comprising a processing unit PUx configured to control a component 120(*x*);
a PCBA 110(*y*) comprising a processing unit PUy configured to control a component 120(*y*);
a PCBA 110(*e*) comprising a processing unit PUe configured to control a component 120(*e*);
a PCBA 110(*s*) comprising a processing unit PUs configured to control a component 120(*s*).

According to a first non-limitative example in which the household appliance 100 is a laundry machine configured to wash laundry, the component 120(*x*) may be an electronic switch for the selective opening/closing of a hydraulic valve, the component 120(*y*) may be a heating resistor for heating washing liquid, the component 120(*e*) may be a user interface, and the component 120(*s*) may be a graphic display unit.

According to a second non-limitative example in which the household appliance 100 is an oven, the component 120(*x*) may be a heating resistor for heating a cooking cavity of the oven, the component 120(*y*) may be a TRIAC for the control of an oven fan, the component 120(*e*) may be a user interface, and the component 120(*s*) may be a graphic display unit.

According to a third non-limitative example in which the household appliance 100 is a refrigerator, the component 120(*x*) may be a TRIAC for the control of refrigerator liquid compressor, the component 120(*y*) may be a TRIAC for the control of a refrigerator fan, the component 120(*e*) may be a user interface, and the component 120(*s*) may be a graphic display unit.

Generally, the concepts of the present invention can be applied to a wide range of different household appliances comprising a wide range of different electric/electronic components including for example electronic switches, TRIACs, power transistors, heating resistors, electronic displays.

According to an embodiment of the present invention, the household appliance 100 further comprises a communication unit 110(*n*) configured to allow data communication between the household appliance 100 and an external server 140 trough a communication network 150, such as the internet.

According to a first example, the communication unit 110(*n*) is configured to establish a Wi-Fi communication link with a router (not illustrated in figure) configured in turn to establish communication with the communication network 150.

According to a further example, the communication unit 110(*n*) is configured to establish a wireless communication link with the communication network 150 by exploiting a mobile communication network (not illustrated in figure).

According to an embodiment of the invention, the communication unit 110(*n*) comprises a processing unit PUn configured to control hardware components 120(*n*) of the communication unit 110(*n*).

According to an embodiment of the present invention, each of the processing units PUx, PUy, PUe. PUs and PUn is configured to control the corresponding components 120 (*x*), 120(*y*), 120(*e*), 120(*s*) and 120(*n*) during a first operating mode of the household appliance 100 according to (portions of) a corresponding instructions set (firmware) F(x), F(y), F(e), F(s) and F(n) stored in a corresponding memory unit 160(*x*), 160(*y*). 160(*e*), 160(*s*) and 160(*n*), respectively, of said processing unit. It is pointed out that by "first operating mode" it is herein intended a "standard" operating mode of the household appliance 100, during which the household appliance 100 is performing its normal functions. In line with what has been already stated in the introduction part of the present document, hereinafter, said firmware F(x), F(y), F(e), F(s) and F(n) has to be intended to comprise also possible configuration data for the configuration of the firmware itself.

According to an embodiment of the present invention, the PCBAs 110(*x*), 110(*y*), 110(*e*) are coupled to a same data bus 170 for allowing exchange of data among the processing units PUx, PUy and PUe.

According to an embodiment of the present invention, when the household appliance 100 is operating in the first operating mode, the data bus 170 is accessed by the processing units PUx, PUy and PUe according to a peer-to-peer communication protocol, such as for example the Major Appliance Communication System ("MACS") communication protocol employed in most of the household appliances sold by the Applicant of the present patent application.

According to an embodiment of the present invention, the PCBA 110(*e*) and the communication unit 110(*n*) are connected through a data bus 175 for allowing exchange of data between the processing units PUe and PUn.

According to an embodiment of the present invention, when the household appliance 100 is operating in the first operating mode, the data bus 175 is accessed by the processing units PUe, Pun according to a point-to-point communication protocol, such as for example the HACL communication protocol.

According to an embodiment of the present invention, the PCBAs 110(*e*) and 110(*s*) are connected through a data bus 180 for allowing exchange of data between the processing units PUe, PUs.

The arrangement of the PCBAs of the household appliance 100 is such that the only way to access the (external) communication network 150 (and therefore, the external server 140) is through the communication unit 110(*n*).

It is pointed out that the concepts of the present invention can be generally applied to a household appliance 100 comprising a different number of PCBAs, which can be connected to each other with a different arrangement, as long as the communication with the (external) communication network 150 is through the communication unit 110(*n*).

Figure 2:
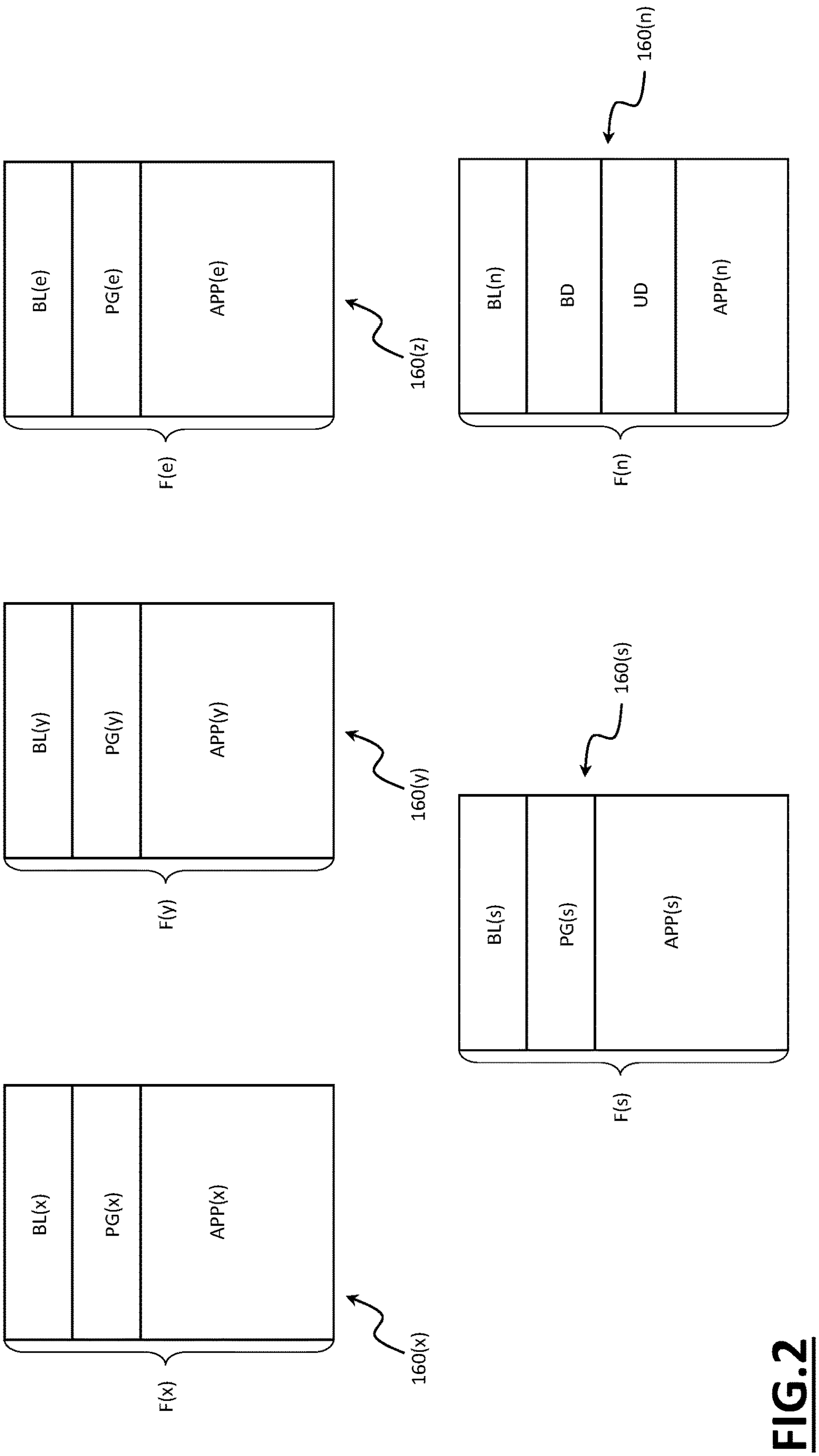
FIG. 2 illustrates an exemplary arrangement of firmware stored in the memory units of processing units of the household appliance of FIG. 1 according to an embodiment of the present invention.
Figure 3A:
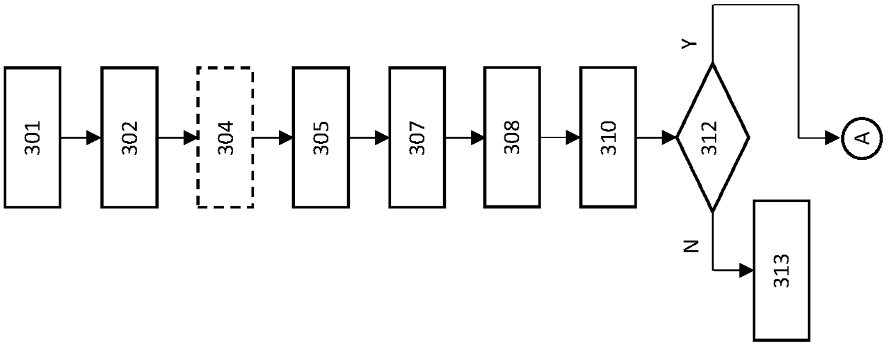
FIGS. 3A-3F depict a flow chart describing the operations carried out by the household appliance for updating the firmware stored in the memory units of FIG. 2 according to an embodiment of the present invention.
Figure 3B:
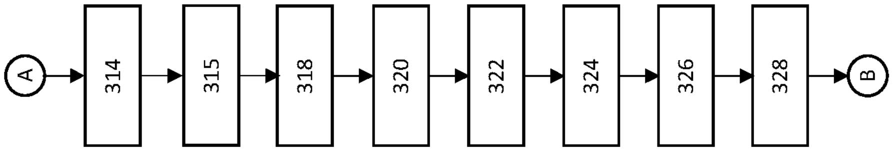
Figure 3C:
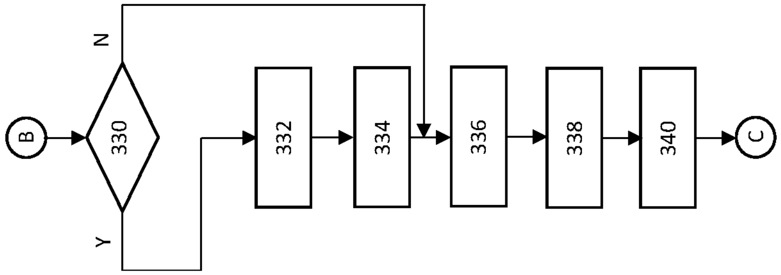
Figure 3F:
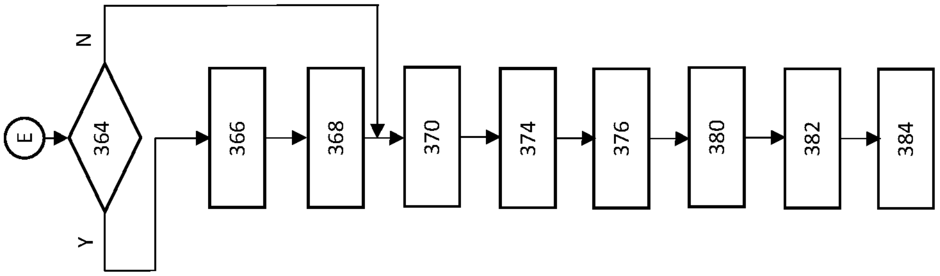
Figure 3E:
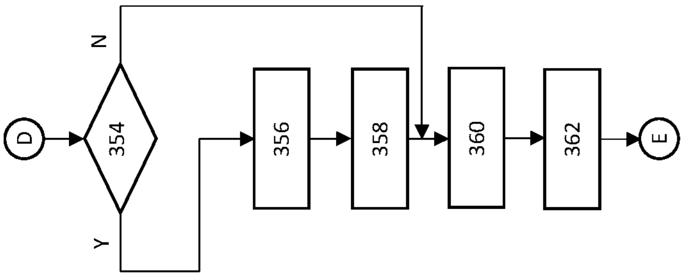
Figure 3D:
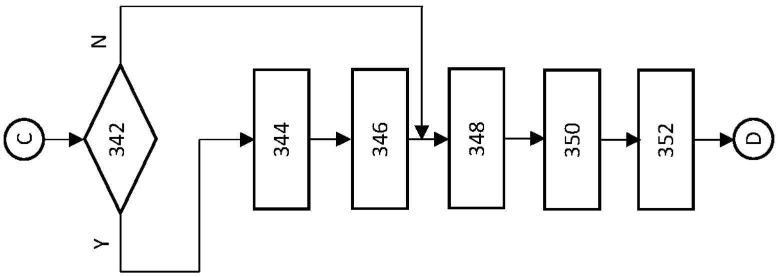

FIG. 2 illustrates in terms of simplified functional blocks an exemplary arrangement of the firmware F(x), F(y), F(e), F(s), F(n) stored in the memory units 160(*x*). 160(*y*), 160(*e*), 160(*s*), 160(*n*) of the processing units PUx, PUy, PUe, PUS, PUn according to an embodiment of the present invention.

According to an embodiment of the present invention, each firmware F(x), F(y), F(e), F(s), F(n) comprises a corresponding bootloader firmware portion BL(x), BL(y), BL(e), BL(s), BL(n) (hereinafter, simply referred to as "bootloader") that is configured to run at the startup of the respective processing unit PUx, PUy, PUe, PUs. PUn.

According to an embodiment of the present invention, each firmware F(x), F(y), F(e), F(s), F(n) further comprises a corresponding application firmware portion APP(x), APP (y), APP(e), APP(s), APP(n) (hereinafter, simply referred to as "application") comprising an instructions set used by the respective processing unit PUx, PUy, PUe, PUs. PUn during the first operating mode of the household appliance 100 for controlling the corresponding component(s) 120(*x*), 120(*y*), 120(*e*), 120(*s*) and 120(*n*). It is pointed out that the application firmware portion (or simply "application") APP(x), APP(y), APP(e), APP(s), APP(n) is herein meant to include, in addition to the instructions set used by the respective processing unit PUx, PUy, PUe, PUs, PUn, also possible configuration data for the configuration of said instruction set.

According to an embodiment of the present invention, the bootloader BL(x), BL(y), BL(e), BL(s), BL(n) is the first portion of the firmware F(x), F(y), F(e), F(s), F(n) that runs at the startup of the respective processing unit PUx, PUy, PUe, PUS, PUn. If the activation of the bootloader BL(x), BL(y), BL(e), BL(s), BL(n) is not forced before a time-out is elapsed, the processing unit PUx, PUy, PUe, PUs, PUn starts to run the application APP(x), APP(y), APP(e), APP(s), APP(n). When instead the bootloader BL(x), BL(y), BL(e), BL(s), BL(n) is activated, plugins extending the features of the bootloader BL(x), BL(y), BL(e), BL(s), BL(n) can be loaded and activated.

Plugins for the bootloaders BL(x), BL(y), BL(e), BL(s) have been identified in FIG. 2 with references PG(x), PG(y), PG(e), PG(s). Example of plugins comprise a so-called "flashloader" configured to open the possibility to erase stored data and/or write new received data, and a so-called "bridge" configured to create a bidirectional link between a serial line used by the bootloader and another serial line.

As will be described in greater detail in the following, according to an embodiment of the present invention, during a second operating mode of the household appliance 100, also referred to as "update mode", the firmware F(x), F(y), F(e), F(s), F(n) stored in the memory units 160(*x*), 160(*y*), 160(*e*), 160(*s*), 160(*n*) of the processing units PUx, PUy, PUe, PUs. PUn may be updated with a new version thereof provided by the external server 140.

On this regard, according to an embodiment of the present invention, the memory unit 160(*n*) of the processing unit PUn is further configured to store a firmware update data distribution UD (hereinafter, simply referred to as "update distribution") received from the external server 140. The update distribution UD is a distribution comprising, for each application APP(x), APP(y), APP(e), APP(s). APP(n) installed in the memory units 160(*x*), 160(*y*), 160(*e*), 160(*s*), 160(*n*) of the processing units PUx, PUy, PUe, PUs. PUn, one or more corresponding firmware update data packages (hereinafter, simply referred to as "update packages UP") comprising a last (updated) version of said application APP(x), APP(y), APP(e), APP(s), APP(n) to be installed in place of the currently installed one.

According to an embodiment of the present invention, the memory unit 160(*n*) of the processing unit PUn is further configured to store a firmware backup data distribution BD (hereinafter, simply referred to as "backup distribution"). The backup distribution BD is a distribution comprising a copy of the current version of the applications APP(x), APP(y), APP(e), APP(s), APP(n), that can be used to restore the correct operation of the household appliance 100 in case something went wrong in the update carried out during the second operating mode of the household appliance 100.

FIGS. 3A-3F depict a flow chart describing the operations carried out by the household appliance 100 for updating the firmware F(x), F(y), F(e), F(s) stored in the memory units 160(*x*), 160(*y*), 160(*e*), 160(*s*) of the processing units PUx, PUy, PUe, PUs according to an embodiment of the present invention.

At the beginning of the flow chart illustrated in FIGS. 3A-3F, the household appliance 100 is operating in the first operating mode, with the processing units PUx, PUy, PUe, PUs, PUn that are configured to control the corresponding component(s) 120(*x*), 120(*y*), 120(*e*), 120(*s*), 120(*n*) according to the applications APP(x), APP(y), APP(e), APP(s), APP(n). In other words, the operations described in the flow chart carried out when the household appliance 100 is in the first operating mode are carried out in background, without affecting the standard operation of the household appliance 100.

According to an embodiment of the present invention, the processing unit PUn (e.g., periodically) interrogates the external server 140 through the communication network 150 about the availability of a firmware update (block 301).

When a new firmware update is available, the processing unit PUn downloads from the external server 140 an update distribution UD and stores it in the memory unit 160(*n*) (block 302).

According to an embodiment of the present invention, the update distribution UD received from the external server 140 is a complete update distribution, i.e., it comprises update packages for all the applications APP(x), APP(y), APP(e), APP(s) of the processing units PUx, PUy, PUe, PUs, even for those applications whose version is already the latest one. As will be described in detail the following, according to an embodiment of the present invention, even if the downloaded update distribution UD comprises update packages UP for all the applications APP(x), APP(y), APP (e), APP(s), the update procedure will involve the actual updating of only those applications APP(x), APP(y), APP(e), APP(s) having a version different from (e.g., older than) the one included in the respective update packages UP of the update distribution UD.

According to an embodiment of the present invention, if no backup distribution BD is already stored in the memory unit 160(*n*) form a previous update, a new backup distribution BD is downloaded from the external server and stored in the memory unit 160(*n*) (block 304).

According to an embodiment of the present invention, the processing unit PUn asks a user of the household appliance 100 for the approval of carrying out an update using the downloaded update distribution UD (block 305).

According to an embodiment of the present invention, once the approval is received, the processing unit PUe forces a reboot of the processing unit PUn (block 307).

According to an embodiment of the present invention, the bootloader BL(n) is then activated, and the processing unit PUn disables communication between the household appliance 100 and the external communication network 150, preventing thus data communication between the household appliance 100 and the external server 140 (block 308), for example by deactivating the components 120(*n*) (e.g., a Wi-Fi module) of the communication unit 110(*n*) responsible of establishing a communication link with the external communication network 150.

In this way, undesired external events and/or unauthorized accesses to the household appliance 100 are advantageously prevented during the following update operations, increasing the reliability of the outcome of the update.

According to an embodiment of the present invention, the processing unit PUn carries out a package verifying phase on the update packages UP of the update distribution UD (block 310).

According to an embodiment of the present invention, the package verifying phase provides for verifying the integrity of the received update distribution UD, in order to avoid that the update is carried out based on a corrupted or incomplete update distribution UD, caused for example by a possible incomplete reception of the update packages UP and/or by the corruption of the latter.

According to an embodiment of the present invention, the package verifying phase further provides for verifying the authenticity of the received update packages UP.

According to an embodiment of the invention, the update packages UP received by the processing unit PUn are protected by means of digital signature, for example through an asymmetric key.

According to an embodiment of the present invention, the package verifying phase provides that the processing unit PUn verifies the digital signature protecting the update packages PU exploiting a digital certificate. According to an advantageous embodiment of the present invention, the package verifying phase further provides that the processing unit PUn checks the validity of said digital certificate.

According to an embodiment of the present invention, the package verifying phase is also carried out for verifying authenticity and/or integrity of the backup distribution BD.

According to an embodiment of the present invention, if the outcome of the package verifying phase is negative (exit branch N of block 312), for example because the update distribution UD has been assessed to be corrupted or incomplete, and/or because the assessment of the authenticity of the received update packages UP has given a negative outcome, the update procedure is aborted (block 313).

According to an embodiment of the present invention, if the outcome of the package verifying phase is positive (exit branch Y of block 312), the household appliance 100 switches from the first operating mode to the second operating mode by having the processing unit PUe disable the applications APP(x), APP(y), APP(e), APP(s) of the processing units PUx, PUy, PUe, PUs (block 314).

In this way, the following update operations are carried out with the household appliance 100 that is a configuration in which the processing units PUx, PUy, PUe, PUs are prevented from controlling the corresponding component(s) 120(*x*), 120(*y*), 120(*e*), 120(*s*). In other words, while the operations up to block 312 are carried out in background, with the household appliance 100 that is still able to actively control the various component(s) 120(*x*), 120(*y*), 120(*e*), 120(*s*) thereof in a standard way, once the household appliance 100 is switched to the second operating mode, the normal operation of the household appliance 100 is prevented.

Moreover, as long as the household appliance 100 is in the second operating mode, the processing units PUx, PUy, PUs are prevented to interact with each other.

According to an embodiment of the present invention, once the applications APP(x), APP(y), APP(e), APP(s) of the processing units PUx, PUy, PUe, PUs have been disabled, the processing unit PUe reboots itself, activating its bootloader BL(e), and then, it forces another reboot of the processing unit PUn, activating again its bootloader BL(n) (block 315).

Then, according to an embodiment of the present invention, the processing unit PUn sends a first plugin PGB1(*e*) to the processing unit PUe through the data bus 175 (block 318). According to an embodiment of the present invention, the sending of the first plugin PGB1(*e*) is carried out according to a point-to-point communication protocol, such as for example the Domestic Appliance Acquisition System ("DAAS") communication protocol. According to an embodiment of the present invention, the first plugin PGB1 (*e*) is a plugin of the "bridge" type, configured to set up a bidirectional link between the processing unit PUe and the processing unit PUs over the data bus 180. The first plugin PGB1(*e*) received by the bootloader BL(e) is then loaded by the bootloader BL(e) of the processing unit PUe and then it is activated.

According to an embodiment of the present invention, the processing unit PUn forces a reboot of the processing unit PUs by sending to the processing unit PUe a reboot message (block 320). Since the processing unit PUe has its bootloader BL(e) that is activated with the first plugin PGB1(*e*), the reboot message received by the processing unit PUe from the processing unit PUn is routed to the processing unit PUs, forcing the reboot of the latter, and the activation of its bootloader BL(s).

Then, according to an embodiment of the present invention, the processing unit PUn sends a second plugin PGB2(*e*) to the processing unit PUe through the data bus 175 (block 322). According to an embodiment of the present invention, the sending of the second plugin PGB2(*e*) is carried out according to a point-to-point communication protocol, such as for example the DAAS communication protocol. According to an embodiment of the present invention the second plugin PGB2(*e*) is a plugin of the "bridge" type, configured to set up a bidirectional link between the processing unit PUe and the data bus 170. The Second plugin PGB2(*e*) received by the bootloader BL(e) is then loaded by the bootloader BL(e) of the processing unit PUe and then it is activated.

According to an embodiment of the present invention, the processing unit PUn forces a reboot of the processing units PUx and PUy by sending to the processing unit PUe a reboot message (block 324). Since the processing unit PUe has its bootloader BL(e) that is activated with the second plugin PGB2(*e*), the reboot message received by the processing unit PUe from the processing unit PUn is routed on the data bus 170, and received by the processing units PUx and Puy, which are therefore forced to reboot themselves, causing in turn the activation of the bootloaders BL(x), BL(y).

At this point, according to an embodiment of the present invention, the processing unit PUn selects a first processing unit to be updated among the processing units PUx, PUy connected to the data bus, such as the processing unit PUx (block 326). According to an embodiment of the present invention, this selection is carried out by sending a selection message S(IDx) containing an identifier IDx of the processing unit PUx to the processing unit PUe. Since the processing unit PUe has its bootloader BL(e) that is activated with the second plugin PGB2(*e*), the selection message S(IDx) is routed on the data bus 170 according to a point-to-point communication protocol, such as for example the DAAS communication protocol. The processing unit connected to the data bus 170 having an identifier matching the identifier included in the message S(IDx)—in this case, the processing unit PUx—replies back by sending an acknowledge message ACK to the processing unit PUn.

According to an embodiment of the present invention, the processing unit PUn sends to the selected processing unit PUx a request to obtain a version identifier VI(x) identifying the version of the firmware F(x)—and particularly of the application APP(x)—actually stored and installed in the memory unit 160(*x*), and the processing unit PUx replies by providing the requested version identifier VI(x) to the processing unit PUn (block 328).

Then, according to an embodiment of the present invention, the processing unit PUn extracts from the downloaded update distribution UD a version identifier VD(x) identifying the version of the update packages UP of the update distribution UD corresponding to the application APP(x), and compares the two version identifiers VI(x), VD(x).

If the version identifier VI(x) is different from the version identifier VD(x) (exit branch Y of block 330), it means that the version of the firmware F(x)—and particularly of the application APP(x)—actually stored and installed in the memory unit 160(*x*) is not the same as (e.g., is older than) the version of the firmware received with the update distribution UD.

In this case, according to an embodiment of the present invention, the processing unit PUn sends a plugin PGF(x) of the "flashloader" type to the selected processing unit PUx (block 332) according to a point-to-point communication protocol, such as for example the DAAS communication protocol. Particularly, according to an embodiment of the present invention, in order to send the plugin PGF(x) to the selected processing unit PUx, the plugin PGF(x) is firstly sent to the processing unit PUe. Since the processing unit PUe has its bootloader BL(e) that is activated with the second plugin PGB2(*e*), the plugin PGF(x) received by the processing unit PUe from the processing unit PUn is routed to the selected processing unit PUx. Then, the plugin PGF(x) is activated, so that the processing unit PUx is switched to a configuration in which it is ready to erase its firmware F(x) and overwrite it with an updated version thereof. According to an embodiment of the present invention, the processing unit PUn drives the processing unit PUx to rewrite its firmware F(x)—and particularly the application APP(x)—with an updated version thereof extracted from update packages UP of the downloaded update distribution UD (block 334). According to an embodiment of the present invention, this operation is carried out by having the processing unit PUn sends to the processing unit PUx a rewrite command WR(x) together with the updated version of the firmware extracted from the update packages UP through the processing unit PUe and exploiting a point-to-point communication protocol, such as for example the DAAS communication protocol. Once the firmware F(x)—and particularly the application APP(x)—of the processing unit PUx is rewritten using the updated version thereof, the processing unit PUn disables the plugin PGF(x). Then, the processing unit PUn deselects the processing unit PUx (block 336).

If the version identifier VI(x) is instead the same of the version identifier VD(x) (exit branch N of block 330), it means that the version of the firmware F(x)—and particularly of the application APP(x)—actually stored and installed in the memory unit 160(*x*) is the same of the version of the firmware received with the update distribution UD, and therefore the firmware F(x) of the processing unit PUx does not require to be updated.

In this case, according to an embodiment of the present invention, the processing unit PUn directly deselects the processing unit PUx (block 336).

At this point, according to an embodiment of the present invention, the processing unit PUn selects the processing unit PUy (block 338). According to an embodiment of the present invention, this selection is carried out by sending a selection message S(IDy) containing an identifier IDy of the processing unit PUy to the processing unit PUe. Since the processing unit PUe has its bootloader BL(e) that is activated with the second plugin PGB2(*e*), the selection message S(IDy) is routed on the data bus 170 according to a point-to-point communication protocol, such as for example the DAAS communication protocol. The processing unit connected to the data bus 170 having an identifier matching the identifier included in the message S(IDy)—in this case, the processing unit PUy—replies back by sending an acknowledge message ACK to the processing unit PUn.

According to an embodiment of the present invention, the processing unit PUn sends to the selected processing unit PUy a request to obtain a version identifier VI(y) identifying the version of the firmware F(y)—and particularly of the application APP(y)—actually stored and installed in the memory unit 160(*y*), and the processing unit PUy replies by providing the requested version identifier VI(y) to the processing unit PUn (block 340).

Then, according to an embodiment of the present invention, the processing unit PUn extracts from the downloaded update distribution UD a version identifier VD(y) identifying the version of the update packages UP of the update distribution UD corresponding to the application APP(y) and compares the two version identifiers VI(y), VD(y).

If the version identifier VI(y) is different from the version identifier VD(y) (exit branch Y of block 342), it means that the version of the firmware F(y)—and particularly of the application APP(y)—actually stored and installed in the memory unit 160(*y*) is different from (e.g., older than) the version of the firmware received with the update distribution UD.

In this case, according to an embodiment of the present invention, the processing unit PUn sends a plugin PGF(y) of the "flashloader" type to the selected processing unit PUy (block 344) according to a point-to-point communication protocol, such as for example the DAAS communication protocol. According to an embodiment of the present invention, in order to send the plugin PGF(y) to the selected processing unit PUy, the plugin PGF(y) is firstly sent to the processing unit PUe. Since the processing unit PUe has its bootloader BL(e) that is activated with the second plugin PGB2(*e*), the plugin PGF(y) received by the processing unit PUe from the processing unit PUn is routed to the selected processing unit PUy. Then, the plugin PGF(y) is activated, so that the processing unit PUy is switched to a configuration in which it is ready to erase its firmware F(y) and overwrite it with an updated version thereof. According to an embodiment of the present invention, the processing unit PUn drives the processing unit PUy to rewrite its firmware F(y)—and particularly the application APP(y)—with an updated version thereof extracted from update packages UP of the downloaded update distribution UD (block 346). According to an embodiment of the present invention, this operation is carried out by having the processing unit PUn sends to the processing unit PUy a rewrite command WR(y) together with the updated version of the firmware extracted from the update packages UP through the processing unit PUe and exploiting a point-to-point communication protocol, such as for example the DAAS communication protocol. Once the firmware F(y)—and particularly the application APP(y)—of the processing unit PUy is rewritten using the updated version thereof, the processing unit PUn disables the plugin PGF(y). Then, the processing unit PUn deselects the processing unit PU7 (block 348).

If the version identifier VI(y) is instead the same of the version identifier VD(y) (exit branch N of block 342), it means that the version of the firmware F(y)—and particularly of the application APP(y)—actually stored and installed in the memory unit 160(*y*) is the same of the version of the firmware received with the update distribution UD, and therefore the firmware F(y) of the processing unit PUy does not require to be updated.

In this case, according to an embodiment of the present invention, the processing unit PUn directly deselects the processing unit PUy (block 348).

Then, according to an embodiment of the present invention, the processing unit PUn drives the processing unit PUe so as to deactivate the second plugin PGB2(*e*) and activate the first plugin PGB(1) (block 350).

At this point, according to an embodiment of the present invention, the processing unit PUn sends to the processing unit PUs a request to obtain a version identifier VI(s) identifying the version of the firmware F(s)—and particularly of the application APP(s)—actually stored and installed in the memory unit 160(*s*), and the processing unit PUs replies by providing the requested version identifier VI(s) to the processing unit PUn (block 352). According to an embodiment of the present invention, the request directed to the processing unit PUs is sent by the processing unit PUn to the processing unit PUe. Since the processing unit PUe has its bootloader BL(e) that is activated with the first plugin PGB(e), the request is routed on the data bus 180 according to a point-to-point communication protocol, such as for example the DAAS communication protocol.

Then, according to an embodiment of the present invention, the processing unit PUn extracts from the downloaded update distribution UD a version identifier VD(s) identifying the version of the update packages UP of the update distribution UD corresponding to the application APP(s) and compares the two version identifiers VI(s), VD(s).

If the version identifier VI(s) is different from the version identifier VD(s) (exit branch Y of block 354), it means that the version of the firmware F(s)—and particularly of the application APP(s)—actually stored and installed in the memory unit 160(*s*) is different from (e.g., older than) the version of the firmware received with the update distribution UD.

In this case, according to an embodiment of the present invention, the processing unit PUn sends a plugin PGF(s) of the "flashloader" type to the processing unit PUs (block 356) according to a point-to-point communication protocol, such as for example the DAAS communication protocol. According to an embodiment of the present invention, in order to send the plugin PGF(s) to the processing unit PUs, the plugin PGF(s) is firstly sent to the processing unit PUe. Since the processing unit PUe has its bootloader BL(e) that is activated with the first plugin PGB1(*e*), the plugin PGF(s) received by the processing unit PUe from the processing unit PUn is routed to the processing unit PUe. Then, the plugin PGF(s) is activated, so that the processing unit PUs is switched to a configuration in which it is ready to erase its firmware F(s) and overwrite it with an updated version thereof. According to an embodiment of the present invention, the processing unit PUn drives the processing unit PUs to rewrite its firmware F(s)—and particularly the application APP(s)—with an updated version thereof extracted from update packages UP of the downloaded update distribution UD (block 358). According to an embodiment of the present invention, this operation is carried out by having the processing unit PUn send to the processing unit PUs a rewrite command WR(s) together with the updated version of the firmware extracted from the update packages UP through the processing unit PUe and exploiting a point-to-point communication protocol, such as for example the DAAS communication protocol. Once the firmware F(s)—and particularly the application APP(s)—of the processing unit PUs is rewritten using the updated version thereof, the processing unit PUn disables the plugin PGF(s), and then disables the plugin PGB1(*e*) (block 360).

If the version identifier VI(s) is instead the same of the version identifier VD(s) (exit branch N of block 354), it means that the version of the firmware F(s)—and particularly of the application APP(s)—actually stored and installed in the memory unit 160(*s*) is the same of the version of the firmware received with the update distribution UD, and therefore the firmware F(s) of the processing unit PUs does not require to be updated.

In this case, according to an embodiment of the present invention, the processing unit PUn directly disables the plugin PGB1(*e*) (block 360).

The processing unit PUe is now in a configuration without plugins of the "bridge" type activated. Therefore, the messages sent by the processing unit PUn are now received by the processing unit PUe as a final recipient (the messages being no more further routed to other processing units).

According to an embodiment of the present invention, the processing unit PUn sends to the processing unit PUe a request to obtain a version identifier VI(e) identifying the version of the firmware F(e)—and particularly of the application APP(e)—actually stored and installed in the memory unit 160(*e*), and the processing unit PUe replies by providing the requested version identifier VI(e) to the processing unit PUn (block 362). According to an embodiment of the present invention, the request is sent according to a point-to-point communication protocol, such as for example the DAAS communication protocol.

Then, according to an embodiment of the present invention, the processing unit PUn extracts from the downloaded update distribution UD a version identifier VD(e) identifying the version of the update packages UP of the update distribution UD corresponding to the application APP(e) and compares the two version identifiers VI(e, VD(e).

If the version identifier VI(e) is different from the version identifier VD(e) (exit branch Y of block 364), it means that the version of the firmware F(e)—and particularly of the application APP(e)—actually stored and installed in the memory unit 160(*e*) is different from (e.g., older than) the version of the firmware received with the update distribution UD.

In this case, according to an embodiment of the present invention, the processing unit PUn sends a plugin PGF(e) of the "flashloader" type to the processing unit PUe (block 366) according to a point-to-point communication protocol, such as for example the DAAS communication protocol. Then, the plugin PGF(e) is activated, so that the processing unit PUn is switched to a configuration in which it is ready to erase its firmware F(e) and overwrite it with an updated version thereof. According to an embodiment of the present invention, the processing unit PUn drives the processing unit PUs to rewrite its firmware F(e)—and particularly the application APP(e)—with an updated version thereof extracted from update packages UP of the downloaded update distribution UD (block 368). According to an embodiment of the present invention, this operation is carried out by having the processing unit PUn sends to the processing unit PUe a rewrite command WR(e) together with the updated version of the firmware extracted from the update packages UP exploiting a point-to-point communication protocol, such as for example the DAAS communication protocol. Once the firmware F(e)—and particularly the application APP(e)—of the processing unit PUe is rewritten using the updated version thereof, the processing unit PUn disables the plugin PGF(e) (block 370).

If the version identifier VI(e) is instead the same of the version identifier VD(e) (exit branch N of block 364), it means that the version of the firmware F(e)—and particularly of the application APP(e)—actually stored and installed in the memory unit 160(*e*) is the same of the version of the firmware received with the update distribution UD, and therefore the firmware F(e) of the processing unit PUe does not require to be updated.

In this case, according to an embodiment of the present invention, the processing unit PUn directly disables the plugin PGF(e) (block 370).

At this point, the processing units PUx, PUy, PUe. PUs have installed the last (newest) available version of the firmware F(x), F(y), F(e), F(s).

Therefore, according to an embodiment of the present invention, the household appliance 100 can be switched back to the first operating mode so that the processing units are enabled to control the corresponding component(s) 120(*x*), 120(*y*), 120(*e*), 120(*s*) exploiting the last available version of the firmware F(x), F(y), F(e), F(s).

For this purpose, according to an embodiment of the present invention, the processing unit PUn forces again the reboot of the processing units PUx, PUy, PUS while the processing unit PUe reboot itself (block 374). These reboots are performed without causing the activation of the corresponding bootloaders BL(x), BL(y), BL(e), BL(s), and are followed by an enabling of the corresponding applications APP(x), APP(y), APP(e), APP(s) (block 376).

Then, according to an embodiment of the present invention, the processing unit PUn is rebooted without causing the activation of the corresponding bootloader BL(n), and the processing unit PUn enables again communication between the household appliance 100 and the external communication network 150, allowing thus data communication between the household appliance 100 and the external server 140 (block 382), for example by activating again the components 120(*n*) (e.g., a Wi-Fi module) of the communication unit 110(*n*) responsible of establishing a communication link with the external communication network 150.

At this point, according to an embodiment of the present invention, the processing unit PUn is configured to store in the memory unit 160(*n*) a new backup distribution BD in the place of the already stored one (block 384).

It is pointed out that the operations carried out by the household appliance 100 for updating the firmware F(x), F(y), F(e), F(s) according to the embodiments of the invention described above provide that the household appliance 110 receives a complete update distribution UD comprising update packages UP for all the firmware F(x), F(y), F(e), F(s) of the processing units PUx, PUy, PUe, PUs, but the actual update through rewriting of the firmware is carried out (possibly, only) for a set (e.g., a subset) of the processing units, i.e., only for selected processing units having a firmware version different from (e.g., older than) the one contained in the update packages UP of the received update distribution UD.

Moreover, since the update distribution UD received from the external server 140 comprises the update packages UP for all the firmware F(x), F(y), F(e), F(s) of the processing units PUx, PUy, PUe. PUs, said update distribution UD may also be exploited as a new backup distribution BD. This is particularly advantageous, since it does not require further operations because the update distribution UD is already stored in the memory unit 160(*n*) of the processing unit PUn.

It is pointed out that although in the present description reference has been made to a very specific example in which the processing unit PUn of the communication unit 110(*n*) is connected to a single processing unit PUe, and all the other processing units PUx, PUy, PUs are connected to said processing unit PUe (the processing units PUx, PUy through the data bus 170, the processing unit PUs through the data bus 180), the concepts of the present invention can be directly applied to different arrangements, in which the number of processing units is different and/or the processing units are connected to each other in a different way.

Moreover, while in the embodiments of the invention described above the update involved only the firmware F(x), F(y), F(e), F(s) of the processing units PUx, PUy, PUe, PUs, the concepts of the present invention can be directly applied also to cases in which the update concerns also the firmware F(n) of the processing unit P(n).

In the embodiments of the invention described above, the update is mainly managed by the processing unit PUn of the communication unit 110(*n*), since most of the main update operations are carried out by the processing unit PUn.

However, similar considerations applies in case at least some of the update operations are carried out by a different processing unit, such as for example the processing unit PUe. For example, the selection of the processing units to be subjected to an update (i.e., the operations comprising the comparison between the version of the installed firmware and the version of the firmware included in the updated packages of the received update distribution UD) may be carried out by a processing unit different from the processing unit PUn, such as for example the processing unit PUe.

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in other embodiments.

The invention claimed is:

1. A household appliance comprising:

one or more processing units for controlling electrically and/or electronically controllable components of the household appliance according to a corresponding instructions set during a first operating mode of the household appliance, wherein each instructions set corresponding to a processing unit is installed at the processing unit; and a communication unit for allowing a data communication between the household appliance and an external server through a communication network, wherein the communication unit is coupled to the one or more processing units via a data bus, and wherein the communication unit is configured to:

receive from the external server an update data distribution comprising, for each instructions set installed at a corresponding processing unit of the one or more processing units, a corresponding update data package comprising a latest version of the instructions set; and carry out the following operations during a second operating mode of the household appliance:

preventing data communication between the household appliance and the external server by deactivating a portion of the communication unit responsible for establishing the data communication; and providing to each one among a set of selected processing units the corresponding update data package, each selected processing unit of the set of selected processing units being selected based on a comparison between a version of the instructions set installed at the corresponding processing unit with the latest version of the instructions set included in the corresponding update package;

wherein each selected processing unit is configured to update the corresponding instructions set installed thereat with the latest version of the instructions set included in the corresponding update package received from the communication unit.

2. The household appliance of claim 1, wherein the communication unit is further configured for carrying out during the second operating mode the following operations for each processing unit:

comparing a version of the instructions set installed at the processing unit with the latest version of the instructions set included in the corresponding update package; and selecting the processing unit for providing thereto the corresponding update package if the instructions set installed at the processing unit has a version different from the latest version.

3. The household appliance of claim 1, wherein the communication unit is configured for receiving from the external server the update data distribution during the first operating mode of the household appliance.

4. The household appliance of claim 1, wherein the communication unit is configured to verify authenticity and/or integrity of received update data packages during a package verifying phase of the household appliance occurring:

after the data communication between the household appliance and the external server is prevented; and before the second operating mode.

5. The household appliance of claim 4, wherein the received update data packages are protected by a digital signature through an asymmetric key, the communication unit being configured to verify the authenticity and/or integrity of the received update data packages by verifying the digital signature during the package verifying phase of the household appliance through a digital certificate.

6. The household appliance of claim 5, wherein the communication unit is further configured to check a validity of the digital certificate during the package verifying phase of the household appliance.

7. The household appliance of claim 1, wherein each processing unit comprises:

a respective processing unit memory element configured to store the installed instructions set corresponding to the processing unit.

8. The household appliance of claim 1, wherein the communication unit comprises a communication unit memory element configured to store a received update data distribution comprising the update data packages.

9. The household appliance of claim 8, wherein the communication unit memory element is further configured to store a backup data distribution comprising a current version of the instructions set installed at the processing units.

10. The household appliance of claim 9, wherein the communication unit is configured to store into the communication unit memory element a new backup data distribution in place of a previously stored backup data distribution after that each selected processing unit has updated the corresponding instructions set.

11. The household appliance of claim 10, wherein the new backup data distribution corresponds to the received update data distribution comprising the update data packages exploited by the selected processing units for updating the corresponding instructions sets.

12. The household appliance of claim 1, wherein the one or more processing units are prevented from controlling the electrically and/or electronically controllable components of the household appliance during the second operating mode.

13. The household appliance of claim 1, wherein the household appliance is configured to switch from the second operating mode to the first operating mode after that each selected processing unit has updated the corresponding instructions set.

14. The household appliance of claim 1, wherein the household appliance is a selected one among:

a laundry machine configured to wash and/or dry laundry;

a dishwasher;

an oven;

a refrigerator; and a cooking hob.

15. The household appliance of claim 1, wherein the communication unit is configured to, during the second operating mode, force a reboot of a processing unit of the set of selected processing units.

* * * * *